Aug. 25, 1959 G. E. NICHOLSON 2,901,067
SHAFT POSITIONING CLUTCH DEVICE
Filed Sept. 25, 1956 4 Sheets-Sheet 4

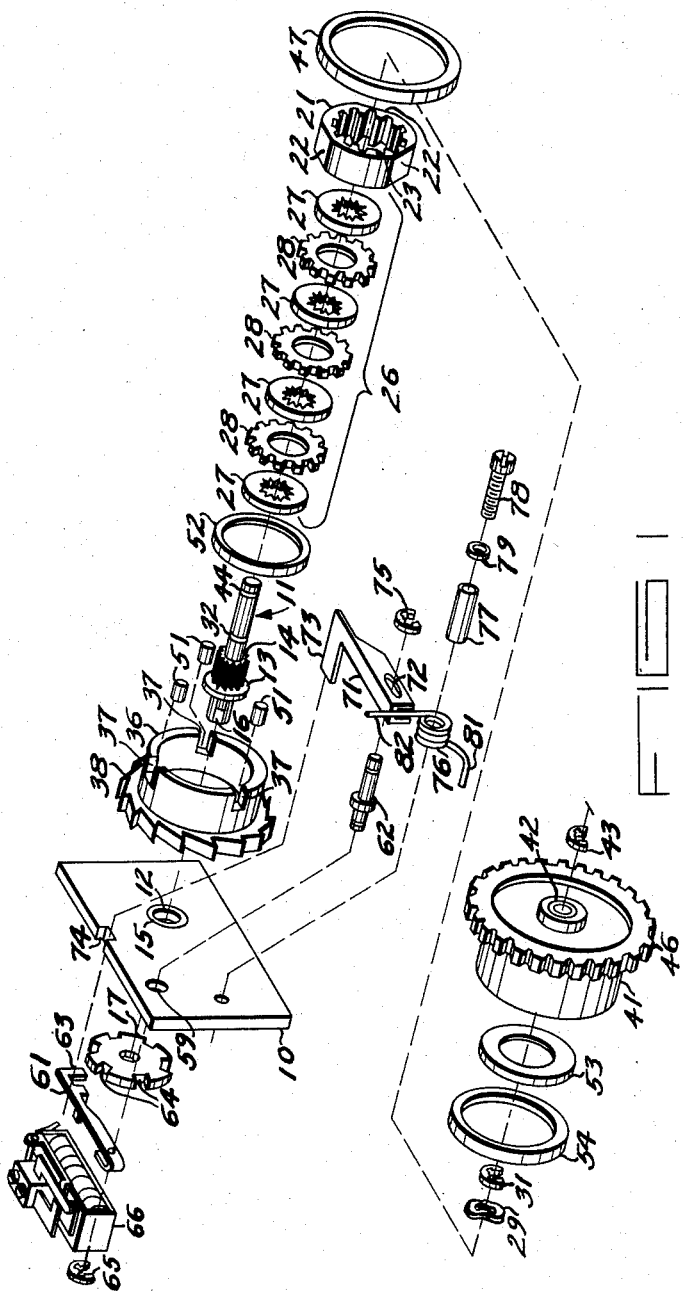
INVENTOR.
GORDON E. NICHOLSON
BY Moody and Goldman
ATTORNEYS

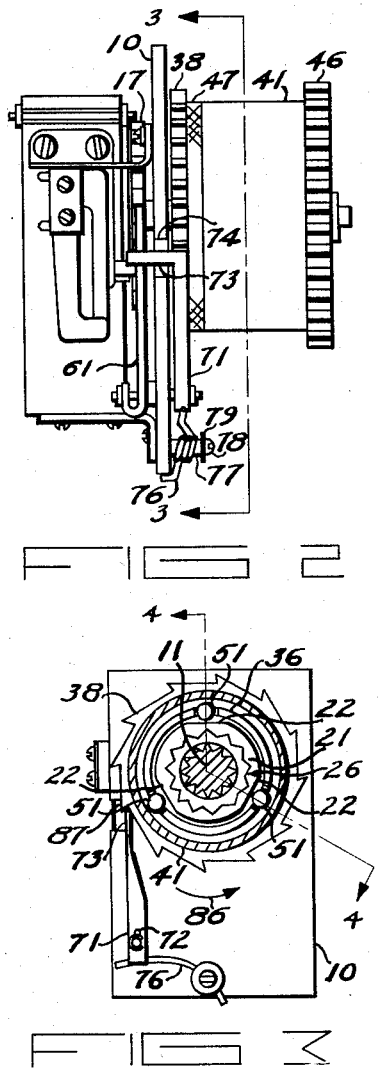

INVENTOR.
GORDON E. NICHOLSON
BY Moody and Goldman
ATTORNEYS

United States Patent Office 2,901,067
Patented Aug. 25, 1959

2,901,067

SHAFT POSITIONING CLUTCH DEVICE

Gordon E. Nicholson, Cedar Rapids, Iowa, assignor to Collins Radio Company, Cedar Rapids, Iowa, a corporation of Iowa Application September 25, 1956, Serial No. 611,948

8 Claims. (Cl. 192—17)

This invention relates to an improved clutch for shaft-positioning systems.

Generally, a shaft-positioning system requires a clutch that instantly decouples a motor from an output shaft when the shaft is moved to and locked in a required rotational position. Decoupling by clutch slippage is conventionally used to reduce shock to the shaft and to the motor at the instant of shaft locking which otherwise could severely damage the associated mechanisms. One example of such a shaft-positioning system is described in Patent No. 2,476,673 to R. W. May and H. M. Schweighofer.

Prior friction clutches used in such shaft-positioning systems were required to slip throughout the decoupled period, during which rotation occurred between the clutch input and output shafts. Generally, there were many revolutions of slippage for each positioning of the output shaft. As a result, wear was caused which disturbed a preset decoupling torque after a moderate amount of use.

Furthermore, during their decoupled state, such prior clutches inherently transmitted a relatively large torque between their input and output shafts, due to the slippage friction.

When a plurality of such clutches were to be driven by a single motor, it had to be sufficiently large to overcome the combined decoupling torques of all clutches but one, which was positioning an unlocked shaft.

It is therefore an object of this invention to provide a clutch device that transmits almost no torque when it is disengaged.

It is another object of this invention to provide a clutch device that permits very little slippage for a friction clutch component, although large amounts of relative rotation occur between its input and output.

It is still another object of this invention to provide a clutch system of small and compact structure which has many times the wearing qualities of conventional torque-limiting friction clutches.

It is a further object of this invention to provide a shaft-positioning clutch system that allows during its engaged position a through-torque equal to the frictional torque of a friction clutch component and provides during its released position a through-torque that is negligible compared to the friction clutch torque.

This invention provides a clutch device which includes a friction clutch as a component between an output shaft and a collar member formed with a plurality of surfaces on its periphery. A driving member is supported concentrically with the assembly and is continuously rotated by driving means not part of this invention, regardless whether the clutch system of the invention is engaged or disengaged. A hub member is received concentrically between the collar member and the driving hub. The hub member rotatably supports a plurality of bearings positioned between the driving member and the respective surfaces of the collar member. Also, a sawtoothed shoulder is fixed to one end of the hub member and protrudes externally from the assembly. A stopwheel is fixed to the output shaft and is rotatably positioned by a stopwheel pawl that locks the output shaft in selected positions. Furthermore, a shoulder pawl is provided to engage the periphery of the sawtoothed shoulder and is lifted by the stopwheel pawl. The shoulder pawl is spring biased toward the short sides of the sawteeth, wherein their short sides lead in the direction of rotation when the shoulder is rotated.

The invention is capable of clutching bidirectionally when the driving hub is driven bidirectionally. In this case, a pair of sawtoothed shoulders are fixed to the hub member with the short edges of their respective sawteeth positioned oppositely. Separate shoulder pawls are provided for engaging the respective sawtoothed shoulders on their short sides, with both shoulder pawls being lifted by the stopwheel pawl, which may be actuated by relay means.

Further objects, features and advantages of this invention will be apparent to a person skilled in the art upon further study of the specification and the drawings, in which:

Figure 1 is an exploded view of an illustrative embodiment of the invention;

Figure 2 is an elevational view of the invention;

Figure 3 is a sectional view taken along line 3—3 in Figure 2;

Figure 4:
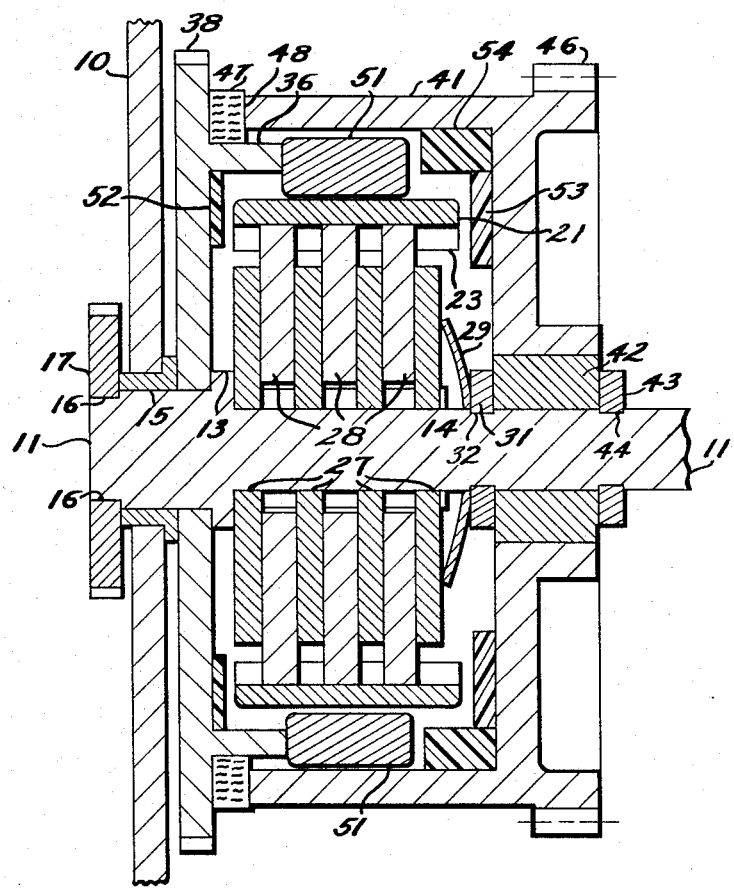
Figure 4 is a sectional view taken along line 4—4 in Figure 3.

Figures 1, 2, 3 and 4 illustrate a unidirectional form of the invention, wherein the input and output of the clutch device are rotatable in a given single direction. The clutch device is supported by a plate 10 that receives an output shaft 11 through a bearing 15, located in a hole 12 in plate 10. Shaft 11 is formed with a shoulder 13 and a spline 14 adjacent to shoulder 13. The part of shaft 11 that protrudes on the opposite side of support 10 from shoulder 13 is deformed and receives a stopwheel 17 in a fixed manner.

The assembly further includes a collar member 21 which is formed with an internal spline 23 and with three flat surfaces 22 symmetrically disposed about its outer periphery. A friction clutch 26 couples collar member 21 to shaft 11. Clutch 26 comprises a plurality of discs 27 and plates 28 that are interleaved. Discs 27 have internal splines that engage spline 14 of shaft 11, and plates 28 have external splines which engage internal spline 23 of collar member 21. Clutch 26 is axially confined on one side by shoulder 13 and on the other side by a spring washer 29 which is axially fastened to shaft 11 by a retaining clip 31 received in a groove 32 formed in shaft 11. The tension of spring washer 29 determines the limiting torque of clutch 26.

A hub member 36 is concentrically received by the assembly and is rotatably received on shaft 11 adjacent to shoulder 13. Hub member 36 is formed with a plurality of slots 37 located respectively adjacent to flats 22 of collar member 21. A sawtoothed shoulder 38 is formed at one end of hub member 36 and protrudes from the assembly. The sawteeth are each formed asymmetrically with a short and a long side, and its short side facing the direction of intended rotation.

A driving member 41 is concentrically received about the slotted portion of hub member 21 and is rotatably supported by a bearing 42 on shaft 11. A clip 43 engages another groove 44 in shaft 11 to axially retain member 41 on the shaft. A gear 46 is formed at one end of driving member 41 and is connected to driving means (not part of the invention) which continuously rotates member 41.

A friction washer 47 is received between the end 48 of driving member 41 and sawtoothed shoulder 38. See Figure 4. Friction washer 47 may be made of felt material or may be a metallic wave-type washer, for example.

A plurality of roller bearings 51 are received respectively in slots 37 of hub member 36. Accordingly, each roller bearing is received between the inner surface of driving member 41 and one of the flats 22 on collar member 21. Thus, it can be seen from Figure 3 that relative movement in either direction between hub member 36 and collar member 21 will wedge bearing 51 between them and lock them together.

A pair of butting rings 52 and 53 are included within the assembly on opposite sides of collar member 21 to prevent excessive axial movement of it with respect to the friction clutch. Their function is best seen in Figure 4.

In a similar manner, a spacer ring 54 is provided in a corner of driving member 41 to limit the axial movement of roller bearings 51 and retain them within slots 37.

A stopwheel pawl 61 is pivotally supported from one end of a pivoting pin 62, which is positioned through a hole 59 in plate 10 and protrudes on both sides. Retaining clip 65 maintains pawl 61 on pin 62. Stopwheel pawl 61 is formed with a projection 63 capable of engaging the notches 64 in stopwheel 17.

A relay 66 is fastened to supporting plate 10. Linkage means are provided between the armature of relay 66 and stopwheel pawl 61 to lift it from engagement with stopwheel 17 in response to energization of the relay.

A shoulder pawl 71, formed with an elongated pivoting hole 72, is received on the other side of pivoting pin 62, and is retained by a clip 75. Shoulder pawl 71 is formed with a lateral projection 73 which engages the sawteeth of shoulder 38, and which also passes transversely through an opening 74 in plate 10 to rest on stopwheel pawl 61. Thus, the shoulder pawl is lifted by the stopwheel pawl but is not forced downwardly with the stopwheel pawl when it is dropped by action of relay 66. Notch 74 prevents interference by plate 10 with the pivoting movement of lateral projection 73.

A spring 76 is pivotally supported by a sleeve 77 that is fastened to supporting frame 10 by a screw 78 and a washer 79. Spring 76 has a transverse end 81 that engages the supporting frame, and its other end 82 engages an end of shoulder pawl 71 to bias it toward one end of elongated hole 72 against sleeve 77.

In the operation of the invention, Figure 3 illustrates a steady-state condition, during which output shaft 11 is decoupled from rotating member 41. It is assumed that driving member 41 is being continuously rotated in the counterclockwise direction of arrow 86 by external driving means (not shown). Stopwheel pawl 61 engages a notch 64 in stopwheel 17 to lock shaft 11 in a given rotational position. Also, shoulder pawl 71 has its projection 73 engaging the short side of a sawtooth 87 of shoulder 38.

With shaft 11 being locked in the given position, collar member 21 is held non-rotative by its connection to shaft 11 through friction clutch 26. Also, in the steady-state condition, each roller bearing 51 is held approximately at the middle of its flat 22 on collar member 21, since both collar 21 and hub member 36 are being held in fixed positions by the engagement of their respective pawls.

In this situation there is no locked connection between driving member 41 and the remainder of the assembly. Therefore, driving member 41 continues rotation without effect upon shaft 11. The only drag to the rotation of driving hub 41 is by shaft bearing 42, loosely-held roller bearings 51, and felt washer 47 which provides a neglible amount of frictional torque compared to the slippage frictional torque obtainable from friction clutch 26.

Accordingly, an external driving means (such as a motor) is permitted to freely rotate driving member 41, since there is very little friction associated with it, while output shaft 11 is locked.

In the coupled condition of the invention, output shaft 11 is unlocked and rotated by driving member 41. This occurs when relay 66 is energized to lift stopwheel pawl projection 73 from a stopwheel notch 64. Since transverse projection 73 of shoulder pawl 71 passes over stopwheel pawl 61, as may be seen in Figure 2, shoulder pawl 71 is lifted out-of-engagement with sawtoothed shoulder 38 by energization of relay 66.

It is assumed that output shaft 11 is connected to a load (not shown) such as, for example, a tuning slug or a rotatable capacitor in radio apparatus, and that the rotational position of shaft 11 tunes the radio apparatus.

At the first instant after disengagement of pawls 61 and 71, the load and the inertia of parts of the invention maintain collar member 21 stationary.

Also initially, felt washer 41 transmits a small amount of torque from driving member 41 to sawtoothed shoulder 38, which is now disengaged from pawl 71. Without any obstruction to its rotation by pawl 71, slotted-hub member 36 rotates in a counterclockwise direction in Figure 3, carrying in its slots 37 the roller bearings 51. After a short amount of relative rotation between roller bearings 51 and collar member 21, each roller bearing 51 becomes wedged between one side of its flat 22 and the inner surface of driving member 41. The wedging locks driving member 41 and collar member 21, forcing collar member 21 to rotate with driving member 41.

Thus, output shaft 11 is locked with hub 21 through friction clutch 26 and rotates in the counterclockwise direction of driving member 41.

It may be noted that friction clutch 26 must provide sufficient torque to move the load. If the load torque should ever become excessive, the invention provides a safety release with the ultimate slippage of clutch 26.

When the output shaft has been rotated to a desired position, relay 66 is de-energized by means not a part of this invention, as for example by the seeking-switch system described in the above-cited patent. At this time, stopwheel pawl 61 drops into the selected notch 64 to obtain the required rotational position for shaft 11. Shaft 11 is now locked and cannot rotate.

Also, shoulder pawl 71 drops with stopwheel pawl 61 and falls on sawtoothed shoulder 38, but in most cases it will not have its projection 73 initially engaging the short side of a sawtooth. Therefore, sawtoothed shoulder 38 does not become locked by pawl 71 until shoulder 38 rotates through the angle of less than one sawtooth.

During the interim of rotation by shoulder 38 for less than one sawtooth, clutch 26 slips. This is because shaft 11 is locked by pawl 61, but sawtoothed shoulder 38 is not then locked by pawl 71. Since the roller bearings remain wedged between collar 21 and driving member 41, collar 21 is forced to rotate and can do so only through the slippage of friction clutch 26. This is the only time that slippage is required for friction clutch 26 in the operation of the invention. This slippage occurs for less than the angle of a single sawtooth, which in Figure 3 is less than 30 degrees of rotation. The number of sawteeth controls the amount of slippage and can be decreased or increased accordingly.

After sawtoothed shoulder 38 rotates the above-mentioned fraction of a sawtooth, the short side of the next sawtooth engages the shoulder pawl 71 and forces it to the left in Figure 3 along its elongated hole 72 against the tension of spring 76. Since the roller bearings are generally wedged securely, they will not be disengaged when the short side of the sawtooth first engages shoulder pawl 71. However, when shoulder pawl 71 is driven to the end of its elongated opening 72, pawl 71 can no longer move to the left in Figure 3; and sawtoothed shoulder 38 can no longer rotate. At this instant, a small clockwise jarring force, caused by the elasticity of the metallic materials is transmitted by pawl 71 to shoulder 38 of slotted hub member 36 which moves roller bearings 51 slightly clockwise to disengage them from their wedged positions.

As soon as the roller bearings are unwedged, the spring tension on pawl 71 moves it upward in Figure 3 to rotate shoulder 38 and roller bearings 51 clockwise by the amount of the elongation of opening 72, which is approximately equal to the distance between the wedged position of a roller bearing and the center of its flat 22. Accordingly, each roller bearing is repositioned by the spring bias to approximately the center of its respective flat 22, where the bearing is loosely held in a fixed position by its hub slot 37 between collar 21 and driving member 41. Thereafter, driving member 41 is free to rotate without slipping clutch 26 and without substantial drag on its driving means in the steady-state condition illustrated in Figure 3.

The above-described form of the invention acts in a unilateral rotational direction. However, the invention can also be utilized with a bidirectional system of rotation. Note that flats 22 are symmetrical and permit wedging between ball bearings 51 and flats 22 equally well in either direction of rotation. All that is additionally needed is a second sawtoothed shoulder fixed to slotted-hub member 36 with its sawteeth pointing in the other direction, and a second shoulder pawl that cooperates with the added sawtoothed shoulder and is similarly lifted by the stopwheel pawl.

Figure 5:
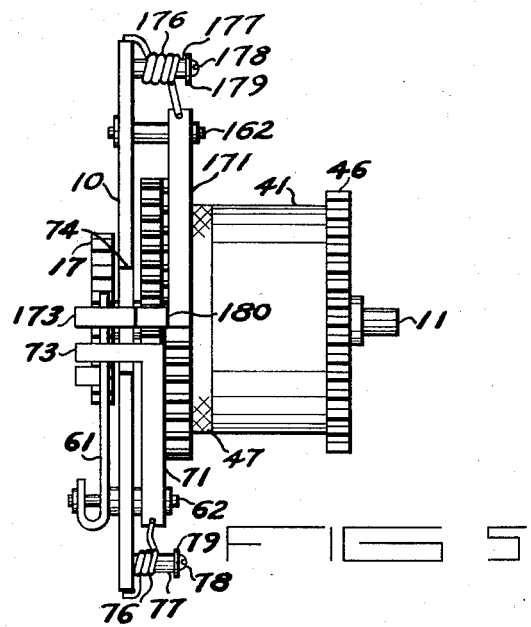
Figure 5 is a elevational view of a bidirectional form of the invention.
Figure 6:
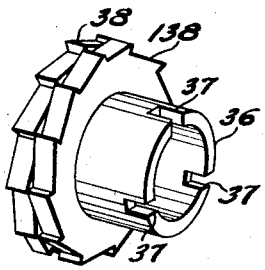
Figure 6 is a perspective view of a bidirectional hub member used in Figure 5.

Figure 5 shows a bidirectional form of the invention. It is internally the same as the form of the invention described in Figures 1 through 4. It includes a slotted-hub member 36 shown in Figure 6 which externally has two sawtoothed shoulders 38 and 138 that protrude from the assembly. The additional shoulder 138 has sawteeth that have their short sides facing in the opposite direction of rotation from the short sides of the sawteeth of shoulder 38.

An additional shoulder pawl 171 is pivoted on a pin 162 fastened to supporting plate 10. Pawl 171 has an elongated pivoting opening (not shown) which may be formed identically to opening 72 in pawl 71. A spring 176 is received on a sleeve 177 fixed to supporting plate 10 by a screw 178, similarly to the assembly of components 76, 77, 78 and 79. Therefore, spring 176 normally biases pawl 171 against pin 162 at one end of its elongated opening, in the same manner as was described for pawl 71.

Pawl 171 also includes a transverse projection 173 which passes over sawtoothed shoulder 38 with a U-shaped riser portion 180 and rests on the upper surface of pawl 61 in the same manner as shoulder pawl 73.

The clutch device shown in Figure 5 operates identically to that described in connection with Figures 1 through 4 but can do so in either direction. Only one of the pawls 71 or 171 is used for a given direction of rotation. The unused pawl does not in any way interfere with the operation of the invention. When sawtoothed shoulders 38 and 138 are rotating with pawl 61 lifted, pawls 71 and 171 are both lifted out of engagement; and when pawl 61 drops, the unused pawl 71 or 171 receives the long sides of its respective sawteeth and no locking action can occur to interfere with the operation of the system.

It is, therefore, realized that the invention provides a clutching system which allows very little wear for its friction clutch component, since for any engagement-disengagement cycle of the invention, the friction clutch component is permitted to slip for only a small fraction of a revolution; although complete freedom of rotation is permitted between the input and output members of the invention when it is disengaged.

Although this invention has been described with respect to particular embodiments thereof, it is not to be so limited as changes and modifications may be made therein which are within the full intended scope of the invention as defined by the appended claims.

I claim:

1. A coupling device for an output shaft comprising collar means formed with a plurality of surfaces about its periphery, torque-limiting clutch means fixed between said collar means and said output shaft, driving means supported on said shaft concentrically with said collar means, hub means supported on said shaft concentrically between said collar means and said driving means, a plurality of bearings supported by said hub means between said driving means and respective surfaces formed on said collar means, a sawtoothed shoulder fixed with said hub means, with the sawteeth each having a long side and a short side, locking means for said output shaft, first pawl means being pivotably supported by said device for engaging said locking means, second pawl means being pivotably supported by said device for engaging said sawtoothed shoulder, said second pawl means being disengaged by disengagement of said first pawl means, and friction means having substantially less torque than said clutch means situated between said hub means and said driving means.

2. A shaft-positioning clutch device comprising a supporting plate, an output shaft rotatably supported by said plate, collar means concentrically positioned about said shaft, friction-clutch means coupling said collar means to said output shaft, hub means supported on said shaft concentrically about said collar means, driving means concentrically supported on said shaft about said hub means, said collar means being formed with a plurality of flat surfaces, a like plurality of bearings being respectively received between said flat surfaces and said driving means, said hub means supporting said bearings, friction means having substantially less frictional torque than said clutch means and being received between said hub means and said driving means, a sawtoothed shoulder fixed with said hub means, a stopwheel fixed to said output shaft, a stopwheel pawl pivotally mounted on said supporting plate and engaging said stopwheel, a shoulder pawl pivotally supported by said supporting plate, lost-motion means formed longitudinally with said shoulder pawl, spring biasing means actuating said shoulder pawl toward said sawtoothed shoulder to one extreme of said last-motion means, and said shoulder pawl being actuated out of engagement with said sawtoothed shoulder by actuation of said stopwheel pawl.

3. A shaft-positioning clutch device comprising a supporting plate, an output shaft rotatably supported by said plate, a stopwheel pawl fixed to said shaft and formed with a plurality of notches, a stopwheel pawl pivotally supported by said plate and engageable with the notches in said stopwheel for locking said shaft rotationally with said plate, a collar member formed with a plurality of surfaces about its periphery, friction-clutch means coupling said collar member to said output shaft, a driving member rotatably received about said collar member, a hub member having a portion received between said collar member and said driving member, said hub portion formed with a plurality of slots, a plurality of bearings respectively received in said slots between said driving member and the surfaces of said collar member, a friction washer coupled between said driving member and said hub member, a sawtoothed shoulder fixed with said hub member and having asymmetrically formed sawteeth, a pivoting pin fixed to said supporting plate, a shoulder pawl formed with an elongated slot that is received over said pivoting pin, spring means biasing said shoulder pawl toward one end of said elongated slot and toward said sawtoothed shoulder, with said shoulder pawl being engageable with the shorter sides of said asymmetrical sawteeth, and means for lifting said shoulder pawl with said stopwheel pawl.

4. A shaft-positioning clutch device comprising a supporting plate, an output shaft rotatably supported by said plate, a collar member formed with a plurality of flat surfaces upon its periphery, torque-limiting clutch means coupling said collar member to said output shaft, a driving member supported on said shaft and having a portion received about said collar, a hub member rotatably received on said shaft and having a portion formed with slots that are received between said driving member and said collar member, a plurality of bearings received in said slots between said driving member and said flat surfaces, a friction washer provided between said hub member and said driving member, a sawtoothed shoulder fixed with said hub member, said shoulder formed with sawteeth, each having a short side and a long side, first pawl means for locking said output shaft with respect to said supporting plate, second pawl means formed with an elongated slot, a pin received through said elongated slot and fixed to said plate, spring means normally biasing said second pawl means toward said sawtoothed shoulder, said second pawl means being capable of engaging the short sides of said sawteeth, and transverse means coupled between said first and second pawl means for disengaging said second pawl means with disengagement of said first pawl means.

5. A device as in claim 4 in which said output shaft is formed with an external spline, said collar member being formed with an internal spline, a plurality of clutch plates being received by the spline of said output shaft, a plurality of clutch discs interleaved with said clutch plates and received by the spline of said collar member, and spring means for forcing said clutch discs and clutch plates together to frictionally connect said collar member with said output shaft.

6. A shaft positioning clutch device supported by a plate, comprising an output shaft rotatably supported by said plate, a stopwheel formed with notches fixed to said output shaft, a stopwheel pawl pivotably supported by said plate for rotationally locking said stopwheel, means for lifting and releasing said stopwheel pawl, a collar member concentrically supported about said output shaft, a friction clutch coupling said hub member to said output shaft, said collar member formed with a plurality of symmetrically located flats on its periphery, a driving member rotatably supported on said output shaft and having a portion concentrically received about said collar member, a hub member rotatably supported on said output shaft and having a portion received between said driving member and said collar member, said hub member portion being formed with a plurality of slots, a plurality of roller bearings received in said hub member slots between said driving member and said flats, a sawtoothed shoulder formed with said hub member and extending outwardly, a friction washer received between said sawtoothed shoulder and said driving member, a shoulder pawl for engaging said sawtoothed shoulder pivotably mounted on said plate, means for providing axial lost motion for said shoulder pawl with respect to said plate, spring means biasing said shoulder pawl toward said sawtoothed shoulder to one extremity of its lost-motion means, with the sawteeth of said shoulder being asymmetrically formed with their shorter sides capable of engaging said sawtoothed-shoulder pawl, and a transverse member coupling said shoulder pawl and said stopwheel pawl during the disengagement cycle of said stopwheel pawl to cause disengagement of said shoulder pawl.

7. A shaft positioning clutch device comprising a supporting plate, an output shaft rotatably supported by said plate, said shaft formed with a shoulder and a spline, a plurality of clutch plates received on said spline, a collar member formed with a plurality of asymmetrically located flat surfaces about its periphery and also formed internally with a spline, a plurality of clutch discs received by said collar spline and interleaved with said clutch plates, first spring means fixed to said shaft and biasing said clutch plates and discs together against said shaft shoulder, a driving member rotatably supported on said shaft about said collar member, a hub member rotatably supported on said shaft formed with a portion extending between said driving member and said collar member, with said hub member portion formed with a plurality of slots adjacent to said flat surfaces on said collar member, a plurality of bearings respectively received in the slots of said hub member between said driving member and said flat surfaces, a friction washer positioned between said driving member and said hub member, a sawtoothed shoulder formed with said hub member and extending externally, said sawtoothed shoulder formed with asymmetric sawteeth, each having a short side and a long side, a stopwheel fixed to said output shaft and formed with a plurality of notches, a stopwheel pawl pivotably supported by said plate for engaging said stopwheel notches, a shoulder pawl formed with an elongated pivoting opening, a pin received in said opening and fixed to said plate, a spring received between said plate and said shoulder pawl to bias it to one end of its elongated opening and toward the short sides of the sawteeth of said shoulder, with said elongated slot in said shoulder pawl having a length equal to approximately one-half the lost-motion movement of any of said bearings on its flat surface, and a lateral portion formed with said shoulder pawl and slideably received over said stopwheel pawl.

8. A device as in claim 7 in which a second sawtoothed shoulder is fixed to said hub member, with the teeth on said second shoulder respectively having short and long sides facing in the opposite rotational direction from the teeth of said first-mentioned sawtoothed shoulder, a second shoulder pawl formed with an elongated pivoting opening of the same proportions as the opening in said first shoulder pawl, a second pin received through said elongated opening in said second shoulder pawl and fixed to said supporting plate, second spring biasing means fixed between said plate and said second pawl to bias it against the short sides of the teeth on said second shoulder, and a lateral portion provided with said second shoulder pawl and slideably received over said stopwheel pawl.

References Cited in the file of this patent

UNITED STATES PATENTS

| | | |
|---|---|---|
| 554,486 | Geb | Feb. 11, 1896 |
| 1,356,557 | Potts | Oct. 26, 1920 |
| 2,089,846 | Finch | Aug. 10, 1937 |
| 2,299,739 | Colucci | Oct. 27, 1942 |